(12) United States Patent
Farat

(10) Patent No.: US 7,359,866 B2
(45) Date of Patent: Apr. 15, 2008

(54) SYSTEMS AND METHODS FOR PROMOTING CUSTOMER LOYALTY ON THE INTERNET

(75) Inventor: Jean-Luc Farat, Paris (FR)

(73) Assignee: Maximiles (FR)

( * ) Notice: Subject to any disclaimer, the term of this patent is extended or adjusted under 35 U.S.C. 154(b) by 0 days.

(21) Appl. No.: 10/465,272

(22) Filed: Jun. 19, 2003
(Under 37 CFR 1.47)

(65) Prior Publication Data

US 2004/0215512 A1 Oct. 28, 2004

Related U.S. Application Data

(63) Continuation of application No. PCT/FR01/04121, filed on Dec. 20, 2001.

(30) Foreign Application Priority Data

Dec. 20, 2000 (FR) .................................. 00 16719

(51) Int. Cl.
  *G06Q 30/00* (2006.01)
(52) U.S. Cl. .............................. 705/14; 705/26; 705/27; 709/205; 709/217; 709/219; 709/229; 707/501; 725/13
(58) Field of Classification Search .................. 705/14, 705/26, 27; 709/205, 217; 725/13; 707/501
See application file for complete search history.

(56) References Cited

U.S. PATENT DOCUMENTS

| 5,537,314 | A | * | 7/1996 | Kanter | 705/14 |
| 5,774,870 | A | | 6/1998 | Storey | |
| 5,794,210 | A | * | 8/1998 | Goldhaber et al. | 705/14 |
| 5,806,045 | A | * | 9/1998 | Biorge et al. | 705/14 |
| 5,937,391 | A | * | 8/1999 | Ikeda et al. | 705/14 |
| 5,948,061 | A | * | 9/1999 | Merriman et al. | 709/219 |
| 6,003,013 | A | * | 12/1999 | Boushy et al. | 705/10 |
| 6,009,412 | A | | 12/1999 | Storey | |
| 6,029,141 | A | * | 2/2000 | Bezos et al. | 705/27 |
| 6,061,660 | A | * | 5/2000 | Eggleston et al. | 705/14 |
| 6,076,101 | A | * | 6/2000 | Kamakura et al. | 709/206 |
| 6,138,911 | A | * | 10/2000 | Fredregill et al. | 235/383 |
| 6,142,371 | A | * | 11/2000 | Oneda | 235/380 |
| 6,334,111 | B1 | * | 12/2001 | Carrott | 705/14 |
| 6,594,640 | B1 | * | 7/2003 | Postrel | 705/14 |

FOREIGN PATENT DOCUMENTS

| EP | 0 987 642 A2 | 3/2000 |
| WO | WO 99/21103 | 4/1999 |
| WO | WO 99/46708 | 9/1999 |
| WO | WO 00/60517 | 10/2000 |

OTHER PUBLICATIONS

Brian Walsh, "Understanding Internet Payment Protocols (Internet/web/Online Service Information)", Network Computing-p133(1): May 3, 1999.*

* cited by examiner

*Primary Examiner*—Jean D. Janvier
(74) *Attorney, Agent, or Firm*—DLA Piper US LLP

(57) ABSTRACT

A method for promoting customer loyalty including recording digital identification data regarding a visitor to sites in a first database including a registration table on a customer loyalty server of unique identifiers of registered visitors and selected data, registering on equipment of the visitor of a digital file containing an identifier assigned to the visitor, recording on a server of an affiliated merchant site a digital file producing a display of an active pictogram including a link to a point management computer program, the file including a unique identifier of the affiliated merchant, allocating reward points by recording in a database a table including an identifier of the visitor and a counter of the allocated points, preparing a response to an activation by a user of the link appearing on the page of the merchant's site, a file including at least the digital identifier of the merchant and an identifier of the visitor, transmitting this file to the customer loyalty server, performing a search for the visitor's identifier, incrementing the point counter in relation to the information contained in the digital file in the case in which the visitor is already registered, and transmitting a digital registration form in the contrary case.

14 Claims, No Drawings

SYSTEMS AND METHODS FOR PROMOTING CUSTOMER LOYALTY ON THE INTERNET

RELATED APPLICATION

This is a continuation of International Application No. PCT/FR01/04121, with an international filing date of Dec. 20, 2001, which is based on French Patent Application No. 00/16719, filed Dec. 20, 2000.

FIELD OF THE INVENTION

This invention pertains to the field of systems and methods for promoting customer loyalty on the Internet, more particularly, to promoting loyalty using computer equipment interconnected by the Internet for awarding digital coupons bearing rights to rewards.

BACKGROUND

Known in the state of the art is the service provided by the company NETCENTIVES which is described in U.S. Pat. Nos. 5,774,870 and 6,009,412. Also known is WO 99/21103 which pertains to a procedure and an application of incentive programs in a computer network in which a host can make it possible for participating companies to:

to purchase incentive programs packaged in advance or self-generating;

to offer these incentive programs to consumers;

to allow promoting companies and resellers to associate rewards with incentive programs;

to offer noteworthy rewards to promoting companies, resellers and consumers; and to store in memory and manipulate databases containing all of the above.

WO 99/46708 discloses a system making it possible to define, electronically distribute, dynamically display to the attention of a consumer, to exchange and compensate promotional incentives on a network. One or more parameters associated with the promotions can be determined dynamically as a function of one or more characteristics of the consumer, notably consumer location on the network on which the promotion is displayed.

WO 00/60517 describes a computerized reward system and electronic procedure for which the targeting, distribution, selection, storage in memory, exchange, compensation, reimbursement and data management are performed electronically. The system makes the rewards available in a central reward system located in a computer system, targets the rewards to specific consumers or groups of consumers and enables the consumers to select the rewards. The system stores in memory the names or identification numbers of the consumers in relation to the rewards selected by the consumers, transmits the consumers' purchases when the consumer makes a purchase from a retailer and provides the retailer with the consumer's identification. The retailer then connects to the central reward system and compares the purchases with the selected rewards stored in memory for the consumer. In the case of agreement, there is application of the reward and automatic compensation of the consumer. The system also provides for the automatic reimbursement of the retailer. Furthermore, the consumer's purchase data and reward exchange are stored in memory and used for targeting future awards for the consumer or a group.

It would therefore be advantageous to provide a system and a procedure enabling organization of the awarding of points in real time with a high degree of security against fraud by the intermediary of a central server and computer resources installed on the servers of affiliated merchants on the one hand and identified clients on the other hand.

SUMMARY OF THE INVENTION

This invention relates to a method for promoting customer loyalty including recording digital identification data regarding a visitor to sites in a first database including a registration table on a customer loyalty server of unique identifiers of registered visitors and selected data, registering on equipment of the visitor of a digital file containing an identifier assigned to the visitor, recording on a server of an affiliated merchant site a digital file producing a display of an active pictogram including a link to a point management computer program, the file including a unique identifier of the affiliated merchant, allocating reward points by recording in a database a table including an identifier of the visitor and a counter of the allocated points, preparing a response to an activation by a user of the link appearing on the page of the merchant's site, a file including at least the digital identifier of the merchant and an identifier of the visitor, transmitting this file to the customer loyalty server, performing a search for the visitor's identifier, incrementing the point counter in relation to the information contained in the digital file in the case in which the visitor is already registered, and transmitting a digital registration form in the contrary case.

DETAILED DESCRIPTION

The invention pertains in its broadest sense to a method for promoting customer loyalty comprising recording digital identification data regarding the visitors to sites in a first database comprising a registration table on a customer loyalty server of unique identifiers of registered visitors and specific data, and registration on the equipment of the visitor of a digital file containing the identifier assigned to the visitor. The method also comprises steps of recording on the server of an affiliated merchant site of a digital file producing the display of an active pictogram comprising a link to a point management computer program, the file comprising a unique identifier of the affiliated merchant and steps of allocating reward points consisting of recording in a database a table comprising an identifier of the visitor and a counter of the allocated points, of preparing in response to an activation by a user of the link appearing on the page of the merchant's site, a file comprising at least the digital identifier of the merchant and an identifier of the visitor, of transmitting this file to the customer loyalty server, of performing a search for the visitor's identifier, of incrementing the point counter in relation to the information contained in the digital file in the case in which the visitor is already registered and of transmitting a digital registration form in the contrary case.

According to one preferred mode of implementation, the method comprises a step of comparing the digital file transmitted by the visitor's equipment with a digital file of anomalies recorded on the server, and incrementing the visitor's counter only when the comparison is positive. The method preferably comprises a prior step of transmission to the visitor's equipment by the server of a file producing the display of an information message regarding the visitor's counter status.

According to another aspect, the method comprises a step of personalization of the reward allocation rules comprising selecting at least one parameter from the merchant station and registering in a server table containing the merchant's identifier and the reward allocation parameters.

Better understanding of the invention will be obtained from the description below of a nonlimiting example of implementation.

The customer loyalty system employs a customer loyalty server connected to the Internet as well as merchant servers and client servers. The merchant servers are constituted of computer equipment connected to the Internet and exploited by affiliates of the customer loyalty server.

The customer loyalty system provides a first step of affiliation of a new merchant. This step comprises registering in a database a unique identifier of the new merchant as well as data related to its identity. In this database there are also recorded the parameters specific to a customer loyalty program selected by this merchant. These parameters define the modality and conditions of allocating rewards:

action of the visitor triggering allocation of points,
duration of the action and consequence,
authorization of repetition or not of the action, and
periodicity of actions resulting in a reward.

These parameters are defined by means of a digital form transmitted by the server to the merchant's station allowing selection of values corresponding to the procedures recorded in a library of procedures.

This personalization step of the customer loyalty program by the merchant results in the registration of a profile associated with the merchant's identifier and the transmission by the server of a digital file which will be recorded on the merchant's site. This file corresponds, for example, to a line of HTML code written on the page of the merchant's site to produce the display of a pictogram upon access to this page by a visitor. This pictogram will furthermore be associated with a site connecting the visitor with the customer loyalty server.

When the visitor activates the site, it causes the execution of a script for sending a file containing a possible identifier of the visitor, recorded in the form of a cookie, and the identifier of the merchant. When the server receives a message in which the visitor's identifier is nonexistent, it transmits to the visitor's station a digital form enabling subscription. This subscription consists of registration in a database of information associated with the visitor's unique identifier.

In the case in which the visitor is already registered, the server proceeds to a detection of anomalies comprising analyzing the connection file as well as the prior connection files from the same visitor and comparing these files with an anomaly file. In the case in which this comparison flags the new file as abnormal, the reward allocation process is suspended.

An anomaly includes, for example, an excessive number of actions on the same site by the same visitor, for example, by use of a robot for generation of requests. In this case, to avoid unjustified allocation of rewards, it is suitable to prohibit the granting of rewards when the number of requests exceeds a threshold value corresponding to an abusive action.

The description below pertains to a particular example of implementation of the invention intended to:

simplify to the greatest possible extent integration of the specific tools of the invention in affiliated sites, eliminate to the greatest possible extent the transactions between the affiliated sites and the server to provide speedy navigation, and obtain a risk of fraud close to zero.

The invention includes different methods by which a visitor acquires customer loyalty points, i.e., that an affiliate grants customer loyalty points to a visitor:

automatically from the customer loyalty points server (after a questionnaire, on an anniversary date, etc.): no security problem because no transactions pass via the network, upon consultation of a Web page (click on a site, frequency of visits, etc.): see part: "indirect allocations", and following a specific action on the affiliated site (online purchase, shop purchase, contest, etc.): see part "direct allocations".

Upon registration on the server site, the visitor (internaut desiring to benefit from the proposed advantages) receives a cookie indicating a visitor number (ID). This number can only be read by the server site. It can also be read or modified by the user. However, a consequence of such a change is to cause another visitor to benefit from the winnings of the prior visitor. If the visitor uses multiple navigators or loses its configuration, the visitor is offered a choice on the server site to redefine the visitor's cookie by simple re-identification (login+password).

1. Indirect Allocations

Indirect allocations are not managed by the affiliate, but by the server.

First, the affiliate provides the server with a list of winning conditions; for example: the condition carrying the name ACCUEIL01 [WELCOME01] is valid from Apr. 1, 2000 to Apr. 30, 2000 and allows the visitor to win 5 points at the rate of one winning per week at most.

A fresh table is provided to the affiliated site by the server:

| NomCo [condition name] | Start date | Start time | End date | End time | Points | Duration | Period value | Generating actions |
|---|---|---|---|---|---|---|---|---|
| accue [welcome] | Apr. 1, 2000 | 00:00 | Apr. 30, 2000 | 23:59 | 5 | week | 1 | 500 |
| conco [contest] | May 1, 2000 | 00:00 | May 15, 2000 | 23:59 | 10 | single | 1 | 283 |

Integration of the Winning Conditions (Indirect Allocations)

A winning condition is represented by:

condition name: an identifier selected by the affiliate of a maximum of 40 characters. Only numerals and letters are accepted (no punctuation, accents or spaces). The server distinguishes between upper and lower case, date and time of the beginning of validity of the condition, date and time of the end of validity of the condition, the number of Maxipoints won, the periodicity of the winnings: this is broken down into:

the type of periodicity: minute, day, week, month, one-time, fixed date,
minutes—number of minutes to wait until winning again,
days—number of days,
weeks—number of weeks,
months—once per month,
one time—one can only win once,
fixed date—one can only win once during the days/months,
periodicity value: a numeric value or days/months for the type of periodicity "fixed date".
for example: type=weeks, value=2 means that it is possible to win 1 time every two weeks.
the code "generator act": in most cases, this is code 500. If the affiliate site proposes to win Maxipoints from a contest, it is necessary to define one (an only one) condition bearing this code (283).

The code list of the generator acts is shown in the table below:

| Code | Generator acts |
| --- | --- |
| 100 | Purchase |
| 110 | Cancellation of purchase |
| 220 | Surf - special offer |
| 230 | Purchase - special offer |
| 500 | Surf |
| 520 | Questionnaire |
| 550 | Promotional bonus |
| 560 | Welcome bonus |
| 600 | Newsletter subscription |
| 620 | Forum subscription |
| 901 | Random drawing |
| 902 | Quiz |
| 903 | Contest |

The second replaces the first if a winning condition has the same name as a preceding condition to avoid cascade errors.

Integration on the Affiliated Site

Integration of indirect allocations is equivalent to integration of an HTML tag for an advertising banner:

The affiliate places on its site a link to an image on the server site. This image bears the ACCUEIL01. The server recognizes:
the visitor by unique ID stored in a cookie,
the affiliate by the headings transmitted by the navigator, and
the condition by its name "ACCUEIL01".

The server then verifies that the condition ACCUEIL01 is completely fulfilled (validity dates, periodicity and the like). In the three cases that are then presented, the resultant images are integrated in the affiliate's Web site and the operation is transparent for the visitor.

The winning conditions are fulfilled: the visitor is immediately credited and the server sends an image indicating that the visitor has won 5 points.

The visitor has already won 5 points within the week and receives an image indicating that win for this condition.

The user is not recognized as a visitor: it is proposed to the user that the user become a visitor or if the user already is a visitor to redefine the user's cookie ("to Win" image).

An exact detailed account of the indirect allocations is provided at the end of the month to each affiliate so that it can monitor the allocation of points and replenish its account if there is a shortage of points. The win conditions are preferably transmitted by the affiliate by an electronically encrypted message. The data transmitted to the server is constituted of 7-bit ASCII text files. If accented characters must be transmitted, the coding can be extended to 8 bits and use the ISO 8850-1 standard.

The examples presented pertain to a fictional affiliate "ACME".

All of the data transmitted by electronic message from the affiliate to the server are encrypted with the server's public key and signed with the affiliate's private key.

The message's subject contains: [Conditions] when the electronic message is a list of win conditions.

The body of the message contains the data to be transmitted, encrypted and signed.

The encryption procedure is specific to the affiliate's environment and its implementation choice (directly on the http server machine or on another machine).

Transmission of the Win Conditions

The server provides the affiliated site with a document of the blank table type containing the fields to be filled out. The affiliate fills out this grid (all of the fields must be filled in), exports it in a text file transmitted to the server as an electronic message to the electronic address of the server administrator in an encrypted manner as indicated in the procedures for use of a cryptosystem.

The affiliate fills out this table to define its parameters and transmits it to the server. An acknowledgement of receipt is sent to the affiliated site. It specifies:
addition of conditions,
replacement of conditions, and
rejections: if a condition can not be processed by the Maxipoint robot, it indicates the cause of the rejection and the affiliate must resubmit this condition after correction.

In order for a visitor to win points when displaying an affiliated html page, the affiliate incorporates in its page a CGI request to the server in the form of a relocated image (<IMG SRC="xxxx">). The image transmitted by the server depends on the satisfaction (or not) of the win condition (see § indirect allocations).

The html page of the affiliate includes:

<ATARGET="_blank"HREF=http://www.maxipoints.com/join.php?FROM=identifiant affilié>
<IMG SRC=http://www.maxipoints.com/maxibanner.php?identifant_affilié/NomCondition WIDTH="118" ALIGN="BOTTOM" BORDER="0"></A>
[identifiant_affilié = affiliate identifier]

The identifiant_affilié is issued by the server.

The displayed images will be of an "already won" first type.
When the visitor wins 100 points or is already passed on a winning page.
When the visitor is not recognized as a registered visitor.
Another image can be incorporated manually by the affiliate to indicate on which topic the visitor can win points.

Other graphical elements can be incorporated in the pages of the affiliated site to enhance the server on its site.

2. Direct Allocations

For online purchases especially, the granting of points will be encoded by the affiliated server and transmitted by encrypted electronic message.

The principal value of direct allocations is based on the free incorporation of the principle of points on the affiliate's Web site. The system is not limited to purchases. It is characterized by a high degree of flexibility because the affiliate can decide which actions will generate wins in relation to its service. For example, sending a message in a forum can generate a gain of 50 points for the person sending the message and a gain of 5 points for this same person each time that somebody reads the message. This system can also apply to a contest organized by the affiliate who can cause winnings of different amounts after random drawings, etc.

This flexibility simply means that the affiliated site receives the identifier of the visitor points to be able to allocate the win to the visitor. This process can be implemented in various manners, either after a purchase, for example, or upon registration of the person's address, once articles have been selected, it is possible to add an "identifier" field to be filled out by the visitor in this case for each purchase.

Or if the site manages the accounts for its own visitors, add to its visitor file a specific field for the identifier, such that it is not necessary to request this identifier with each win, thus the server will be capable of determining from its visitor file whether or not the person is registered to be able to allocate a win.

When the affiliate wishes to allocate points to a visitor, it must:

encode the allocation according to the specification in the paragraph Transmission of sales (direct allocations); the document indicates the visitor's access name, the time and date of the allocation (to manage the allocations of maxipoints via maxipoints.com with retrocessions) and the number of maxipoints granted, and this document will then be encrypted with the Maxipoints public key, signed with the affiliate's private key and transmitted to a specific Maxipoints electronic message address: admin@maxipoints.com.

Upon reception of messages on this specific electronic message account, the server:

verifies that the message was truly transmitted by the affiliate (by means of the signature), decrypts the document with the server's private key, verifies the validity of the data (date of the condition, number of wins per period, etc.), applies the credit pending validation: once the sale is verified by the affiliate, the affiliate will validate (or invalidate) the points won. This validation will also be encrypted and sent to the server by electronic message, or validates the reward directly if the affiliate can confirm immediately the validity of the purchase.

A monthly status report summarizes for the affiliate all of the data validated by the server.

Transmission of Sales (Direct Allocations)

If the affiliate must confirm the validity of the sale before transferring the points, it first sends via electronic message a text file having the following format: (each line ends with a carriage return)

| | |
|---|---|
| AFFILIÉ: <nom_du_affilié> | [AFFILIATE:] |
| LOGINVISITEUR: <login_du_visiteur> | [VISITOR LOGIN] |
| TIMECODE: <date_et_heure_de_la_vente> | [DATE & TIME] |
| NBPOINTS: <nombre_de_points_gagnés> | [NUMBER OF POINTS] |
| CATEGORIE: <catégorie_de_vente> | [CATEGORY] |
| IDENTIFIANT: <identifiant_vente_du_affilié> | IDENTIFIER |
| DESCRIPTIF: <personalized description of the transaction> | [DESCRIPTION] |
| DATEVALID: <validation date of the transaction> | [VALIDATION DATE] |
| <blank line> | |

It is possible to simultaneously transmit multiple allocations (for example, one at the end of each day). To do this, it is merely necessary to add the allocations to the information taking care to leave a blank line between two allocations.

The values transmitted are:

<nom_du_affilié>

This name is provided by the server to the affiliated site (affiliate identifier).

Example:

AFFILIÉ: ACME
<login_du_visiteur>

The user's identifier (captured at the time of online purchase). This identifier is composed of a maximum of 20 alphanumeric characters.

Example:

LOGINVISITEUR: PIERRE201
<date_et_heure_de_la_vente>

Time and date of the sale coded according to the pattern: DD/MM/YYYY HH:MN:SS

Example:

TIMECODE: 21/05/2000 12:34:56
<nombre_de_points_gagnés>

Number of points acquired from the sale

Example:

NBPOINTS: 50
<catégorie_de_vente>

The category of sale is the code corresponding to the type of product/service sold according to the table below.
Example (the sale corresponds to toys):

CATEGORIE: 580
<identifiant_vente_du_affilié>

Unique identifier generated by the affiliate at the time of the sale (for example, invoice number) which will be used to validate the sale. This identifier can contain up to 80 alphanumeric characters (numbers, letters with case sensitivity, punctuation over 7 bits).
Example:
IDENTIFIANT: A45678_BA?12300/1220-2
DESCRIPTIF: <personalized description of the transaction>
Detailed description of the transaction which is shown to the visitor when consulting an account.
Example:
DESCRIPTIF: Jean-Hughes Mansard de Douomond. Trip Paris—Brives La Gaillarde on Nov. 18, 2000. Price=390 francs. Ref: 123456789.
DATEVALID: <validation date of the transaction>
Validation date of the transaction on the visitor's account in the format: YYYYMMDD.
Example:
DATEVALID: 20000109

Transmission of validations of online sales (direct allocations)

After verification of the sale causing allocation of points or if the affiliate does not have to wait for validating the sale, it sends via electronic message a confirmation in the form of a text file having the following format:

| | |
|---|---|
| AFFILIÉ: <nom_du_affilié> | [AFFILIATE:] |
| LOGINVISITEUR: <login_du_visiteur> | [VISITOR LOGIN] |
| TIMECODE: <date_et_heure_de_la_vente> | [DATE & TIME] |
| NBPOINTS: <nombre_de_points_gagnés> | [NUMBER OF POINTS] |
| CATEGORIE: <catégorie_de_vente> | [CATEGORY] |
| IDENTIFIANT: <identifiant_vente_du_affilié> | IDENTIFIER |
| VALIDATION: <OUI or NON> | VALIDATION |
| <blank line> | |

These fields are the same as those sent during the transmission of the sale (see that paragraph) with the addition of the field "validation".

<OUI or NON>    <YES or NO>

The 3 characters of the response. "Yes" indicates that the sale is validated and the visitor is credited in a definitive manner. "No" indicates that the sale was rejected and the points are not credited.
Example:
VALIDATION: YES If the line VALIDATION is absent or blank, the allocation of points is put on hold pending validation and is not credited until expiration of the deadline specified by the affiliate (minimum of 8 days). If the allocation is refused during this period (refusal to pay, refusal of delivery, etc.), the affiliate must return the same file with the line VALIDATION: NO to cancel the allocation of points.

In this case also, it is possible to confirm multiple sales by separating the information with a blank line.

Return of Errors

If the affiliate provides us with an electronic message response address for transactions, it can receive an identical copy of the file it transmitted with a supplementary line indicating the result. This result line is explained as follows:

| | |
|---|---|
| Result: 0 | Everything OK |
| Result: 1 | Visitor login unknown |
| Result: 2 | Number of points <=0 |
| Result: 3 | Invalid affiliate |
| Result: 4 | Internal problem |
| Result: 5 | Exception during file updating (invalid date, etc.) |

Conventions

The data transmitted is constituted of ASCII 7-bit text files. If accented characters must be transmitted, the coding can be expanded to 8 bits, using the ISO standard 8859-1.

The indicated examples pertain to a fictional affiliate "ACME".

Encryption and Transmission of Data Via Electronic Message

All data transmitted by electronic message from the affiliate is encrypted with the server's public key and signed with the affiliate's private key.

The subject of the message contains:
[Gain] {Win} when the electronic message pertains to a direct allocation.

The body of the message contains the data to be transmitted, encrypted and signed.

The encryption procedure is specific to the affiliate's environment and implemented by choice (directly on the http server machine or on another machine).

4. Monitoring the Affiliation

It is necessary to determine whether people having clicked on the affiliated links of the server site indeed arrive on the requested affiliated site and if the page of this affiliate can be clearly seen in its entirety by the internaut.

When the internaut decides to visit one of the affiliates, the internaut clicks on the corresponding affiliated link. This link calls up a page from the server which makes it possible, among other functions, to trace the requests for access to affiliated sites and then to direct them to the requested affiliated site. However, it is impossible to know whether the request was successful and the internaut was able to see the affiliate's page in its entirety.

The system employed includes placing on the affiliate's site an HTML marker (TAG) at the end of the page called up from the server. This TAG calls up a script located on the server site.

This script verifies that this request follows from the request for access to an affiliated site from the server site and traces the consequences.

The integration on the affiliated site includes placing the following HTML TAG at the end of the page:

<IMG SRC=http://www.maxipoints.com/maxiblanc,php?identifianit_affilié: ALIGN=BOTTOM" BORDER="0">

Visually this integration does not display anything and does not affect the appearance of the affiliate's site.

The invention is described above as an example of implementation of installation of the method for the promotion of customer loyalty.

The invention claimed is:

1. A method for promoting customer loyalty comprising:

establishing on a customer loyalty server a first database for storing visitor identification data, the database comprising a registration table for storing unique identifiers of registered visitors;

establishing on the customer loyalty server a second database for storing merchant identification data, the identification data including unique merchant identifiers of affiliate merchants;

recording in the second database a unique merchant identifier and an associated profile of at least one affiliate merchant;

the customer loyalty server generating and transmitting to the at least one affiliate merchant a digital file for integrating onto the affiliate merchant's website, the digital file comprising an HTML tag comprising a link to the customer loyalty server, the link being served by a common gateway interface (CGI) script;

upon a visitor's access to the at least one affiliate merchant's website, executing the CGI script, the CGI script generating a second digital file comprising:

the unique merchant identifier; and if the visitor is registered, a unique identifier of the visitor previously recorded on equipment of the visitor;

transmitting the second digital file to the customer loyalty server for processing to determine whether the second digital file comprises the visitor's unique identifier, thereby signaling to the customer loyalty server whether the visitor is registered;

if the visitor is registered, allocating reward points to the visitor according to the affiliate merchant's profile by incrementing a counter associated with the visitor; and transmitting to the visitor an active pictogram for displaying the allocated reward points, in the case where the visitor is registered, or transmitting a digital registration form to the visitor if the visitor is not registered.

2. The method according to claim 1, further comprising the steps of:

comparing digital data contained in the second digital file with a digital file of anomalies recorded on the customer loyalty server, and incrementing the visitor's counter only when said comparison is positive.

3. The method according to claim 1, further comprising transmission to the visitor's equipment by the customer loyalty server a file producing a display of an information message regarding the visitor's counter status.

4. The method according to claim 1, wherein the HTML tag provokes a request to the customer loyalty server to transmit an image of an active pictogram dependent on the satisfaction of a point allocation condition selected from the group consisting of (a) the visitor is unknown, (b) the visitor has already won reward points, and (c), the visitor presently wins reward points.

5. The method according to claim 1, further comprising defining point allocation conditions in a profile file by the at least one affiliated merchant;

transmitting said profile file of point allocation conditions to the customer loyalty server, wherein said step of incrementing the counter of allocated points is performed if the point allocation conditions are completely fulfilled.

6. The method according claim 5, wherein said profile file is transmitted by an electronic message from the at least one affiliated merchant to the customer loyalty server and is encrypted with a public key of the customer loyalty server and signed by a private key of the affiliated merchant.

7. The method according to claim 5, further comprising personalizing the point allocation conditions by selecting at least one parameter from the profile file and registering the parameter in a server table containing the merchant's identifier and the point allocation parameters.

8. The method according to claim 1, further comprising affiliating a new merchant by registering a unique identifier and identity data of the new merchant in the second database of the customer loyalty server.

9. The method according to claim 1, further comprising the step of registering a new visitor, the registering step comprising recording a unique identifier of the new visitor in the registration table on the customer loyalty server.

10. The method according to claim 1, further comprising periodically counting points allocated by the affiliated merchant and transmitting an account to the affiliated merchant.

11. The method of claim 1, wherein the unique identifier of the visitor is a cookie.

12. The method according to claim 1, wherein the HTML tag is of the form of a relocated image (<IMG SRC="xxxx">) comprising the CGI request.

13. The method according to claim 1, wherein access to the affiliated merchant's website results from a click from the visitor to call up a web page from a merchant server, and the method further integrating an additional HTML tag at the end of the web page, the additional tag calling up an additional script on the customer loyalty server to verify that the call follows a first call to access the web page.

14. The method according to claim 1, wherein the HTML tag comprises a parameter linked to a point allocation condition and to an active pictogram.

* * * * *